United States Patent
Feichtinger et al.

(10) Patent No.: US 9,266,272 B2
(45) Date of Patent: Feb. 23, 2016

(54) APPARATUS FOR PRETREATMENT AND SUBSEQUENT CONVEYING OF PLASTIC MATERIAL HAVING A POCKET

(71) Applicant: Erema Engineering Recycling Maschinen und Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 0 days.

(21) Appl. No.: 14/351,687

(22) PCT Filed: Oct. 12, 2012

(86) PCT No.: PCT/AT2012/050158
§ 371 (c)(1),
(2) Date: Apr. 14, 2014

(87) PCT Pub. No.: WO2013/052986
PCT Pub. Date: Apr. 18, 2013

(65) Prior Publication Data
US 2014/0234462 A1    Aug. 21, 2014

(30) Foreign Application Priority Data

Oct. 14, 2011    (AT) ................ A 1509/2011

(51) Int. Cl.
*B29C 47/10*    (2006.01)
*B01F 15/02*    (2006.01)
(Continued)

(52) U.S. Cl.
CPC ......... *B29C 47/1027* (2013.01); *B01F 15/0289* (2013.01); *B02C 18/086* (2013.01);
(Continued)

(58) Field of Classification Search
CPC .. B01F 7/162; B01F 15/0288; B01F 15/0289; B29B 2017/048; B29B 17/0412; B02C 18/086; B29C 47/1027

USPC ......... 366/76.2, 76.3, 76.4, 76.6, 76.9, 76.91, 366/76.92, 76.93, 154.1, 155.1, 156.1, 366/158.4, 91, 147, 149, 168.1, 172.1, 366/172.2, 200, 314; 425/586–587
See application file for complete search history.

(56) References Cited

U.S. PATENT DOCUMENTS

| | | |
|---|---|---|
| 2,927,007 A | 3/1960 | Kaether |
| 3,867,194 A | 2/1975 | Straube |

(Continued)

FOREIGN PATENT DOCUMENTS

| | | |
|---|---|---|
| AT | 400315 B | 12/1995 |
| DE | 2839446 B1 | 1/1980 |

(Continued)

OTHER PUBLICATIONS

International Preliminary Report on Patentability mailed Jan. 30, 2014, from PCT Application No. PCT/AT2012/050158 (14 pages).

(Continued)

*Primary Examiner* — Charles Cooley
(74) *Attorney, Agent, or Firm* — Kilpatrick Townsend & Stockton LLP

(57) ABSTRACT

Disclosed is an apparatus for the processing of plastics, with a container with a rotatable mixing implement, wherein the imaginary continuation of the longitudinal axis of a conveyor in a direction opposite to the direction of conveying passes the axis of rotation, where, on the outflow side, there is an offset distance between the longitudinal axis and the radial parallel to the longitudinal axis, wherein in the wall section that is part of the housing and that immediately follows the intake aperture in the direction of conveying and that completely surrounds the screw, a pocket extends in the direction of conveying, starting at the downstream edge of the intake aperture over a length (L), where $0.8\,d \leq L \leq 9\,d$, where d is the external diameter or the diameter of the envelope curve of the screw in the wall section.

35 Claims, 4 Drawing Sheets

(51) Int. Cl.
*B29B 13/10* (2006.01)
*B29B 17/00* (2006.01)
*B29B 17/04* (2006.01)
*B02C 18/08* (2006.01)
*B29C 47/66* (2006.01)
*B29C 47/40* (2006.01)
B29C 47/00 (2006.01)
B29C 47/38 (2006.01)
B29K 105/26 (2006.01)

(52) U.S. Cl.
CPC ............ *B29B 13/10* (2013.01); *B29B 17/0026* (2013.01); *B29B 17/0412* (2013.01); *B29C 47/0004* (2013.01); *B29C 47/1018* (2013.01); *B29C 47/38* (2013.01); *B29C 47/40* (2013.01); *B29C 47/666* (2013.01); B29B 2017/048 (2013.01); B29C 47/0009 (2013.01); B29C 47/0011 (2013.01); B29C 47/385 (2013.01); B29C 2793/0081 (2013.01); B29K 2105/26 (2013.01); Y02W 30/62 (2015.05); Y02W 30/625 (2015.05)

(56) References Cited

U.S. PATENT DOCUMENTS

| | | | |
|---|---|---|---|
| 4,579,288 A | | 4/1986 | McDermid et al. |
| 5,102,326 A | * | 4/1992 | Bacher et al. ................. 425/202 |
| 5,282,548 A | * | 2/1994 | Ishihara .......................... 222/55 |
| 5,651,944 A | | 7/1997 | Schulz et al. |
| 5,783,225 A | * | 7/1998 | Bacher et al. ................. 425/202 |
| 5,882,558 A | | 3/1999 | Bacher et al. |
| 5,988,865 A | * | 11/1999 | Bacher et al. ............. 366/76.93 |
| 6,619,575 B1 | * | 9/2003 | Bacher et al. ............. 241/46.11 |
| 6,719,454 B1 | * | 4/2004 | Bacher et al. ................. 366/314 |
| 6,784,214 B1 | * | 8/2004 | Bacher et al. ................... 521/48 |
| 6,883,953 B1 | * | 4/2005 | Bacher et al. ............... 366/76.1 |
| 7,275,703 B2 | * | 10/2007 | Bacher et al. ............. 241/152.2 |
| 7,275,857 B2 | * | 10/2007 | Bacher et al. ................. 366/314 |
| 7,291,001 B2 | * | 11/2007 | Bacher et al. ................. 425/202 |
| 7,309,224 B2 | * | 12/2007 | Bacher et al. ................. 425/202 |
| 7,842,221 B2 | * | 11/2010 | Magni et al. .................. 264/322 |
| 8,399,599 B2 | * | 3/2013 | Hackl et al. ............... 528/308.3 |
| 8,419,997 B2 | * | 4/2013 | Hackl et al. .............. 264/328.17 |
| 8,616,478 B2 | * | 12/2013 | Weigerstorfer et al. ........ 241/57 |
| 8,835,594 B2 | * | 9/2014 | Hackl et al. ............... 528/308.3 |
| 8,992,067 B2 | * | 3/2015 | Bacher et al. ................... 366/75 |
| 2004/0202744 A1 | | 10/2004 | Bacher et al. |
| 2004/0232578 A1 | | 11/2004 | Magni et al. |
| 2006/0093696 A1 | * | 5/2006 | Bacher et al. ................. 425/200 |
| 2006/0292259 A1 | * | 12/2006 | Bacher et al. ................. 425/217 |
| 2007/0007375 A1 | * | 1/2007 | Bacher et al. ............. 241/199.4 |
| 2007/0102550 A1 | * | 5/2007 | Lin ................................ 241/277 |
| 2010/0101454 A1 | * | 4/2010 | Wendelin et al. ............. 106/243 |
| 2010/0140381 A1 | * | 6/2010 | Weigerstorfer et al. ........ 241/17 |
| 2011/0049763 A1 | * | 3/2011 | Hackl et al. .............. 264/328.17 |
| 2011/0251368 A1 | * | 10/2011 | Hackl et al. ................... 526/352 |
| 2012/0091609 A1 | | 4/2012 | Feichtinger et al. |
| 2012/0200000 A1 | | 8/2012 | Klein et al. |
| 2013/0092768 A1 | * | 4/2013 | Feichtinger et al. ............. 241/20 |
| 2013/0113139 A1 | * | 5/2013 | Weigerstorfer et al. ...... 264/340 |
| 2013/0168201 A1 | * | 7/2013 | Hackl et al. ................... 193/2 R |
| 2014/0234461 A1 | * | 8/2014 | Feichtinger et al. .......... 425/202 |
| 2014/0234462 A1 | * | 8/2014 | Feichtinger et al. .......... 425/202 |
| 2014/0239104 A1 | * | 8/2014 | Feichtinger et al. ....... 241/188.1 |
| 2014/0248388 A1 | * | 9/2014 | Feichtinger et al. .......... 425/203 |
| 2014/0252147 A1 | * | 9/2014 | Feichtinger et al. ............ 241/86 |
| 2014/0252148 A1 | * | 9/2014 | Feichtinger et al. ............ 241/86 |
| 2014/0271968 A1 | * | 9/2014 | Feichtinger et al. .......... 425/202 |
| 2014/0287081 A1 | * | 9/2014 | Feichtinger et al. .......... 425/202 |
| 2014/0291427 A1 | * | 10/2014 | Feichtinger et al. ....... 241/101.2 |
| 2014/0295016 A1 | * | 10/2014 | Feichtinger et al. .......... 425/202 |
| 2014/0299700 A1 | * | 10/2014 | Feichtinger et al. ....... 241/101.2 |
| 2014/0312151 A1 | * | 10/2014 | Feichtinger et al. ....... 241/101.2 |
| 2015/0239154 A1 | * | 8/2015 | Feichtinger ........ B29B 17/0036 |

FOREIGN PATENT DOCUMENTS

| | | | |
|---|---|---|---|
| DE | 3525554 | A1 | 2/1986 |
| DE | 10140215 | A1 | 2/2003 |
| DE | 202009015256 | U1 | 4/2010 |
| EP | 0045734 | A1 | 2/1982 |
| EP | 0103754 | A1 | 3/1984 |
| EP | 0321742 | A1 | 6/1989 |
| EP | 0701505 | A1 | 3/1996 |
| EP | 0735945 | A1 | 10/1996 |
| EP | 0820375 | A1 | 1/1998 |
| EP | 0911131 | A1 | 4/1999 |
| EP | 1181141 | A1 | 2/2002 |
| EP | 1233855 | A1 | 8/2002 |
| EP | 1273412 | A1 | 1/2003 |
| EP | 1401623 | A1 | 3/2004 |
| EP | 1628812 | A1 | 3/2006 |
| EP | 1628813 | A1 | 3/2006 |
| EP | 2012997 | A1 | 1/2009 |
| EP | 2196255 | A1 | 6/2010 |
| ES | 2214171 | T1 | 9/2004 |
| GB | 2030472 | A1 | 4/1980 |
| JP | 2001-26019 | A | 1/2001 |
| JP | 2001-30244 | A | 2/2001 |
| WO | WO 97/18071 | A1 | 5/1997 |
| WO | WO 0181058 | A1 * | 11/2001 |
| WO | WO 02/36318 | A1 | 5/2002 |
| WO | WO 03/004236 | A1 | 1/2003 |
| WO | WO 03/103915 | A1 | 12/2003 |
| WO | WO 2004087391 | A1 * | 10/2004 ............. B29B 17/00 |
| WO | WO 2004/108379 | A1 | 12/2004 |
| WO | WO 2010/118447 | A1 | 10/2010 |
| WO | WO 2011/051154 | A1 | 5/2011 |

OTHER PUBLICATIONS

International Search Report mailed Feb. 5, 2013, from PCT Application No. PCT/AT2012/050158 (7 pages).
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
Bacher H., "Recycling Von Thermplastischen Primarabfaellen: Recycling Primary Thermoplastic Waste, "Plasteverbarbeiter, Huethig Gmbh, Heidelberg, DE, vol. 46, No. 2, Feb. 1, 1995, pp. 94, 97, & 98, XP000494391, ISSN: 0032-1338.
ASN 14351677. Claims filed Mar. 24, 2015.
ASN 14351869. Claims filed Mar. 11, 2015.

* cited by examiner

APPARATUS FOR PRETREATMENT AND SUBSEQUENT CONVEYING OF PLASTIC MATERIAL HAVING A POCKET

This application is a U.S. National Phase of International Application No. PCT/AT2012/050158, filed Oct. 12, 2012, which claims priority to Austrian Patent Application No. A 1509/2011, filed Oct. 14, 2011, the disclosures of which are incorporated by reference herein.

BACKGROUND

The invention relates to an apparatus for the pretreatment and subsequent conveying, plastification or agglomeration of plastics.

BRIEF SUMMARY

The prior art reveals numerous similar apparatuses of varying design, comprising a receiver (receiving container) or cutter compactor for the comminution, heating, softening and treatment of a plastics material to be recycled, and also, attached thereto, a conveyor or extruder for the melting of the material thus prepared. The aim here is to obtain a final product of the highest possible quality, mostly in the form of pellets.

By way of example, EP 123 771 or EP 303 929 describe apparatuses with a receiver and, attached thereto, an extruder, where the plastics material introduced into the receiver is comminuted through rotation of the comminution and mixing implements and is fluidized, and is simultaneously heated by the energy introduced. A mixture with sufficiently good thermal homogeneity is thus formed. This mixture is discharged after an appropriate residence time from the receiver into the screw-based extruder, and is conveyed and, during this process, plastified or melted. The arrangement here has the screw-based extruder approximately at the level of the comminution implements. The softened plastics particles are thus actively forced or stuffed into the extruder by the mixing implements.

Most of these apparatuses, which have been known for a long time, are unsatisfactory in respect of the quality of the treated plastics material obtained at the outgoing end of the screw, and/or in respect of the quantitative output of the screw. Studies have shown that the requirements placed upon the screw downstream of the container, mostly a plastifying screw, vary during the course of the operation, that mixing container residence times are longer for some batches of the product to be processed than for other batches and that some batches behave differently in the screw. These deviations may be attributable to differences in the nature of the batches of product introduced successively into the container or into the screw, e.g. differences in the nature or thickness of the plastics material, e.g. foil residues, etc., or else uncontrollable events.

For material that is thermally and mechanically homogeneous, there is usually a quality improvement in the product obtained at the outgoing end of the screw when the flight depth of the metering zone of the screw is very large and compression in the screw is kept very low. However, if it is desirable to increase the quantitative output of the screw or to improve the performance for example of a shredder-extruder combination, the screw rotation rate must then be raised, and this means that the shear level is also raised. However, this causes the screw to subject the processed material to higher mechanical and thermal stress, and there is therefore the risk of damage to the molecular chains of the plastics material. Another problem that can arise is greater wear of the screw and of its housing, in particular during the processing of recycling material, by virtue of the contaminants present in this material, e.g. abrasive particles, metal parts, etc., which cause severe wear of the metal parts as they slide across one another, in the screw or in its bearings. Intake performance of the screw in the starting region of the screw housing is also a significant parameter for the quality of processing to treat material in the screw.

Another feature shared by these known apparatuses is that the direction of conveying or of rotation of the mixing and comminution implements, and therefore the direction in which the particles of material circulate in the receiver, and the direction of conveying of the conveyor, in particular of an extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. PET fibres or PET foils, or with materials which at a low temperature become sticky or soft, e.g. polylactic acid (PLA) is that when, intentionally, stuffing of the plastics material into the intake region of the extruder or conveyor, under pressure, is achieved by components moving in the same sense, this leads to premature melting of the material immediately after, or else in, the intake region of the extruder or of the screw. This firstly reduces the conveying effect of the screw, and secondly there can also be some reverse flow of this melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage on the intake and caking of the mixing and comminution implements. A further consequence is reduction of the throughput or quantitative output of the conveyor or extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction.

It is therefore an object of the present invention to overcome the disadvantages mentioned and to improve an apparatus of the type described in the introduction in such a way as to permit very non-aggressive and problem-free intake by the screw of the material to be conveyed, in particular to be extruded, even when these materials are sensitive or strip-shaped, and to permit processing or treatment of these materials to give material of high quality, with high throughput, while making efficient use of time, saving energy, and minimizing space requirement.

The characterizing features of the present disclosure achieve this object in an apparatus of the type mentioned in the introduction.

A first provision here is that the imaginary continuation of the central longitudinal axis of the conveyor, in particular extruder, if this has only a single screw, or the longitudinal axis of the screw closest to the intake aperture, if the conveyor has more than one screw, in a direction opposite to the direction of conveying of the conveyor, passes, and does not intersect, the axis of rotation, where, on the outflow side, there is an offset distance between the longitudinal axis of the conveyor, if this has a single screw, or the longitudinal axis of the screw closest to the intake aperture, and the radial that is associated with the container and that is parallel to the longitudinal axis and that proceeds outwards from the axis of rotation of the mixing and/or comminution implement in the direction of conveying of the conveyor.

The direction of conveying of the mixing implements and the direction of conveying of the conveyor are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excess pressure into the intake region of the conveyor, but instead, in contrast, there is in fact in turn a tendency to remove excess material from that region, in such a way that although there is always sufficient material present in the intake region, the additional pressure exerted is small or almost zero. This method can provide adequate filling of the screw and constant intake of sufficient material by the screw, without any overfilling of the screw with, as a further consequence, local pressure peaks where the material could melt.

Melting of the material in the region of the intake is thus prevented, and operating efficiency is therefore increased, maintenance intervals are therefore lengthened, and downtime due to possible repairs and cleaning measures is reduced.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the above-described strip-shaped or fibrous materials can be resolved more easily, or do not occur at all, since, at the aperture edge situated in the direction of rotation of the mixing implements on the outflow side or downstream, the direction vector for the mixing implements and the direction vector for the conveyor point in almost opposite directions, or in directions that at least to a small extent have opposite sense, and an elongate strip cannot therefore become curved around, and retained by, the said edge, but instead becomes entrained again by the mixing vortex in the receiver.

The overall effect of the design according to the invention is that intake performance is improved and throughput is markedly increased. The stability and performance of the entire system made of cutter compactor and conveyor is thus increased.

The applicant has moreover discovered that the length of a pocket that directly follows the intake aperture plays a significant part in the quality and throughput of the material, in particular of different materials or mixtures of materials.

It has been found that a pocket with the stated length led to a marked increase in uniformity of the material obtained at the end of the conveyor, in particular of an extruder, or of the resultant melt, or that, in a conveyor, in particular at increased throughput under non-aggressive conditions, it was substantially possible to prevent undesired heating or softening of the material, at least in the region of the pocket. It is assumed that local overstuffing of the screw is avoided by virtue of the elongate pocket, in that the volume provided by the pocket not only increases the uniformity of intake of material into the screw but also re-establishes uniformity after overstuffing when excessive material has been charged to some regions of the flights.

According to one advantageous development of the invention, it is envisaged that the conveyor is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radial of the receiver, and that points in the direction of rotation or of movement of the mixing and/or comminution implement and of the direction vector that is associated with the direction of conveying of the conveyor at each individual point or in the entire region of the aperture or at each individual point or in the entire region immediately radially prior to the aperture is zero or negative. The region immediately radially prior to the aperture is defined as that region which is prior to the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the conveyor or of the screw. The direction vector that is associated with the direction of rotation and the direction vector that is associated with the direction of conveying lie within a, preferably horizontal, plane, or in a plane orientated so as to be normal to the axis of rotation.

In another advantageous formation, the angle included between the direction vector that is associated with the direction of rotation of the mixing and/or comminution implement and the direction vector that is associated with the direction of conveying of the conveyor is greater than or equal to 90° and smaller than or equal to 180°, where the angle is measured at the point of intersection of the two direction vectors at the edge that is associated with the aperture and that is situated upstream in relation to the direction of rotation or of movement, in particular at the point that is on the said edge or on the aperture and is situated furthest upstream. This therefore describes the range of angles within which the conveyor must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous formation of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the conveyor is arranged tangentially on the cutter compactor.

In order to ensure that no excessive stuffing effect occurs, the distance, or the offset, between the longitudinal axis and the radial can advantageously be greater than or equal to half of the internal diameter of the housing of the conveyor or of the screw.

It can moreover be advantageous for these purposes to set the distance, or the offset, between the longitudinal axis and the radial to be greater than or equal to 7%, or still more advantageously greater than or equal to 20%, of the radius of the receiver. In the case of conveyors with a prolonged intake region or with grooved bushing or with extended hopper, it can be advantageous for this distance or the said offset to be greater than or equal to the radius of the receiver. This is particularly true for cases where the conveyor is attached tangentially to the receiver or runs tangentially to the cross section of the container.

In a particularly advantageous embodiment here, if the longitudinal axis of the conveyor or of the screw or the longitudinal axis of the screw closest to the intake aperture runs tangentially with respect to the inner side of the side wall of the container, or the inner wall of the housing does so, or the enveloping end of the screw does so, where it is preferable that there is a drive connected to the end of the screw, and that the screw provides conveying, at its opposite end, to a discharge aperture which is in particular an extruder head and which is arranged at the end of the housing.

In the case of conveyors that are radially offset, but not arranged tangentially, it is advantageous to provide that the imaginary continuation of the longitudinal axis of the conveyor in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, set-up, curvature and/or arrangement of the frontal regions or frontal edges that are associated with the mixing and/or comminution implements, act on the plastics material and point in the direction of rotation or of movement, differs when comparison is made with the regions that, in the direction of rotation or of movement, are at the rear or behind.

An advantageous arrangement here provides that, on the mixing and/or comminution implement, implements and/or blades have been arranged which, in the direction of rotation or of movement, have a heating, comminuting and/or cutting effect on the plastics material. The implements and/or blades can either have been fastened directly on the shaft or preferably have been arranged on a rotatable implement carrier or, respectively, a carrier disc arranged in particular parallel to the basal surface, or have been formed therein or moulded onto the same, optionally as a single piece.

In principle, the effects mentioned are relevant not only to compressing extruders or agglomerators but also to conveying screws that have no, or less, compressing effect. Here again, local overfeed is avoided.

In another particularly advantageous formation, it is provided that the receiver is in essence cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container have been orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements have been provided, the lowest mixing and/or comminution implement closest to the base has been arranged at a small distance from the basal surface, in particular in the region of the lowest quarter of the height of the receiver, and also that the aperture has been similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

In another advantageous embodiment of the treatment process, the radially outermost edges of the mixing and/or comminution implements almost reach the side wall.

The container does not necessarily have to have a cylindrical shape with circular cross section, even though this shape is advantageous for practical reasons and reasons of manufacturing technology. When container shapes that deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excess container height is not utilized and it therefore has no further effect on the processing of the material.

The expression conveyor means mainly systems with screws that have non-compressing or decompressing effect, i.e. screws which have purely conveying effect, but also systems with screws that have compressing effect, i.e. extruder screws with agglomerating or plastifying effect.

The expressions extruder and extruder screw in the present text mean extruders or screws used for complete or partial melting of the material, and also extruders used to agglomerate, but not melt, the softened material. Screws with agglomerating effect subject the material to severe compression and shear only for a short time, but do not plastify the material. The outgoing end of the agglomerating screw therefore delivers material which has not been completely melted but which instead is composed of particles incipiently melted only at their surface, which have been caked together as if by sintering. However, in both cases the screw exerts pressure on the material and compacts the same.

Intake performance, throughput and the quality of material are influenced advantageously if there is a further pocket in the housing in the region of the intake aperture. A contribution is achieved towards an increase in the uniformity of the quality of material, if necessary at increased throughput, if, in the pocket and optionally in the further pocket, there is at least one retarding element that assists the flow of material in the direction of conveying and that takes the form of a rib or of a displaceable element or of a wall groove, or at least one such retarding element protrudes into the pocket or delimits the pocket, in order to introduce the material into the screw flights.

In an embodiment advantageous for conveying performance, the retarding element extends over the entire length of the pocket or over the entire length of the further pocket. Non-aggressive conveying is assisted if the length of the respective retarding element in the pocket is from 60 to 100% of L, preferably from 75 to 100% of L, the length of the pocket, where L is from 0.8 to 9 d, preferably from 1 to 7 d, and the retarding element starts at the downstream edge of the intake aperture, in the direction of conveying of the screw, or at the furthest downstream point of the intake aperture.

As a function of the material to be treated and of the desired treatment, in particular in an extruder, the internal wall area of the wall section can be cylindrical or can narrow in the direction of conveying, in particular conically, and/or the distance between the rib or the displaceable element and the envelope curve of the screw in the pocket and/or in the further pocket can be constant, or the distance between the rib or the displaceable element and the envelope curve of the screw in the pocket and/or in the further pocket can alter, in particular can decrease in the direction of conveying.

With various materials it can, if necessary, be advantageous that the respective retarding element extends in a straight line in the direction of conveying parallel to the axis of the screw, or, in the manner of a helix, surrounds the screw along its periphery, where the pitch of the helix is greater than the pitch of the screw, and/or that the rib or the displaceable element extends radially into the housing, and/or that at least one of the retarding elements provided in the further pocket of the wall section is prolonged into the pocket.

Retarding elements that can be used are especially ribs or displaceable elements, or else depressions, e.g. grooves, in the internal wall of the housing. Ribs or displaceable elements have an equivalent effect. The only difference between a rib and a displaceable element is that during operation of the apparatus the position of the displaceable element can if necessary be changed and the apparatus can thus be adapted to be appropriate to different materials requiring treatment or requiring conveying. All of the retarding elements possess a direction component in the direction of conveying.

It can be advantageous for the structure of the housing if the internal cross section of the further pocket corresponds to the cross section of the pocket at the point of, or at the downstream edge of, the intake aperture. A simple structure of the housing is obtained, with increased capability for adaptation to be appropriate to different materials, if the wall section that is part of the housing and that forms the pocket is a housing part that can be inserted exchangeably into the housing and that preferably has the length L, or if the pocket is within a bushing which preferably has the length L and which can be inserted exchangeably into the housing.

It has been found to be advantageous that the number of the retarding elements in the wall section, and therefore also the number of the pockets $A=d/K$, where d is the diameter of the screw measured in mm and K is a value in the range from 10 to 110, in particular from 15 to 90. It is thus possible to adapt the number of the retarding elements to be appropriate for the desired diameter of the screw. The diameter d is always the average diameter of the envelope curve of the screw, or the internal diameter of the housing, as long as the housing is close to the screw.

In another advantageous embodiment of the apparatus according to the invention, the capacity of the pocket per unit of length $V=k\,Vs$, where k is a value in the range from 0.025 to 2, preferably from 0.05 to 1.5, and Vs is the capacity of the screw per unit of length. This can also have a favourable effect on the quality of the material at the end of an extruder.

It has proved advantageous for the helix angle of the retarding elements with respect to the direction of conveying to be from 0° to 75°. If the retarding element encloses an angle of 0° in relation to the direction of conveying, it extends parallel to the direction of conveying.

The screw is advantageously an extruder screw with constant core diameter at least in the region of the pocket and/or of the further pocket.

At least in the region of the pocket, the screw in the apparatus according to the invention is advantageously an extruder screw with constant core diameter.

For the processing of various materials, it can be advantageous if at least a subsection of the wall section surrounding the pocket has a cooling unit, and it is advantageous here that, in the wall of the housing, there is a cooling jacket surrounding the housing, and/or there are cooling ducts, in order to permit setting of the required temperatures in the pocket. Liquid or gaseous media can be used as coolants.

BRIEF DESCRIPTION OF THE DRAWINGS

Further features and advantages of the invention are apparent from the description of the inventive examples below of the subject matter of the invention, which are not to be interpreted as restricting, and which the drawings depict diagrammatically and not to scale.

DETAILED DESCRIPTION

Figure 1:
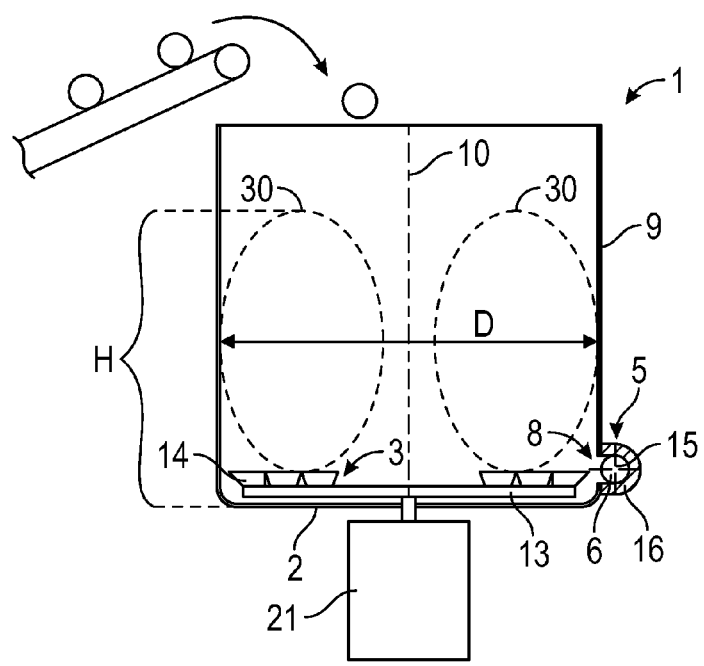
FIG. 1 shows a vertical section through an apparatus according to the invention with extruder attached approximately tangentially.

All of the examples described in the figures depict conveyors with a single screw, for example single-screw extruders. However, it is also possible as an alternative to provide conveyors with more than one screw, for example twin- or multiscrew conveyors or twin- or multiscrew extruders, in particular with a plurality of identical screws, which at least have the same diameters d. It should further be noted that the direction of rotation of the screw is not relevant; the screw can rotate clockwise or anti-clockwise. FIGS. 1 to 4 serve primarily to illustrate the direction of rotation of the implements in relation to the direction of conveying of the screw.

Neither the containers, nor the screws nor the mixing implements are to scale, either themselves or in relation to one another, in the drawings. By way of example, therefore, the containers are in reality mostly larger, or the screws longer, than depicted here.

Figure 2:
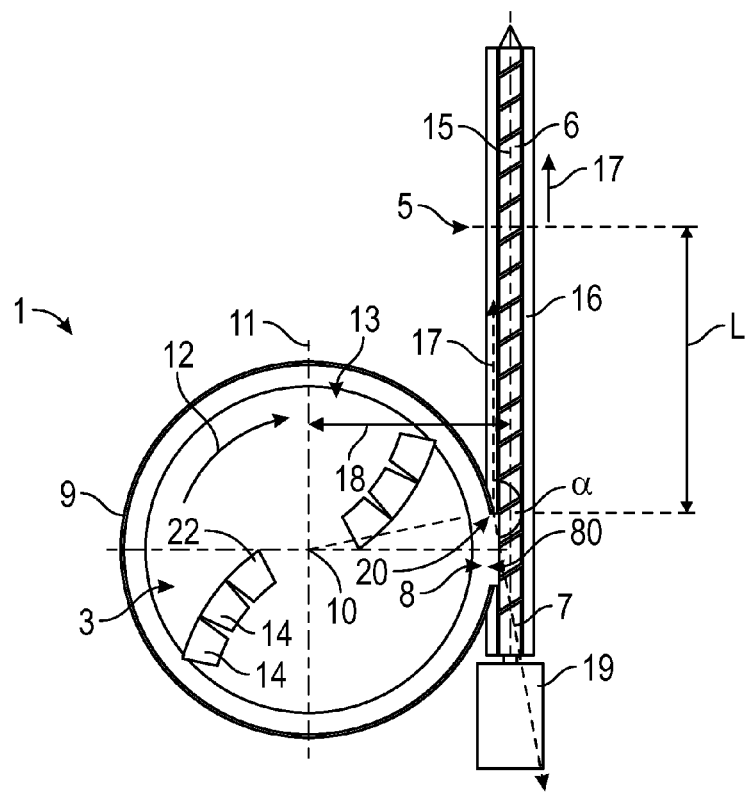
FIG. 2 shows a horizontal section through the embodiment of FIG. 1.

The advantageous cutter-compactor/extruder combination depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 have been arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of an extruder 5, and received by a screw 6 there and subsequently melted.

At the level of the, in the present case single, comminution and mixing implement 3, the said aperture 8 is formed in the side wall 9 of the container 1, and the pretreated plastics material can be removed from the interior of the container 1 through this aperture. The material is passed to a single-screw extruder 5 arranged tangentially on the container 1, where the housing 16 of the extruder 5 has, situated in its jacket wall, an intake aperture 80 for the material to be received by the screw 6. This type of embodiment has the advantage that the screw 6 can be driven from the lower end in the drawing by a drive, depicted only diagrammatically, in such a way that the upper end of the screw 6 in the drawing can be kept free from the drive. The discharge aperture for the plastified or agglomerated plastics material conveyed by the screw 6 can therefore be arranged at this right-hand end, e.g. in the form of an extruder head not depicted. The plastics material can therefore be conveyed without deflection by the screw 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there is a screw 6 with compressing effect, mounted rotatably around its longitudinal axis 15. The longitudinal axis 15 of the screw 6 and that of the extruder 5 coincide. The extruder 5 conveys the material in the direction of the arrow 17. The extruder 5 is a conventional extruder known per se in which the softened plastics material is compressed and thus melted, and the melt is then discharged at the opposite end, at the extruder head.

The mixing and/or comminution implements 3 or the blades 14 are at approximately the same level as the central longitudinal axis 15 of the extruder 5. The outermost ends of the blades 14 have adequate separation from the flights of the screw 6.

In the embodiment according to FIGS. 1 and 2, the extruder 5 is, as mentioned, attached tangentially to the container 1, or runs tangentially in relation to its cross section. In the drawing, the imaginary continuation of the central longitudinal axis 15 of the extruder 5 or of the screw 6 in a direction opposite to the direction 17 of conveying of the extruder 5 towards the rear passes the axis 10 of rotation and does not intersect the same. On the outflow side, there is an offset distance 18 between the longitudinal axis 15 of the extruder 5 or of the screw 6 and the radius 11 that is associated with the container 1 and that is parallel to the longitudinal axis 15 and that proceeds outwards from the axis 10 of rotation of the mixing and/or comminution implement 3 in the direction 17 of conveyance of the conveyor 5. In the present case, the imaginary continuation of the longitudinal axis 15 of the extruder 5 towards the rear does not pass through the space within the container 1, but instead passes the same at a short distance therefrom.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 is everywhere zero or negative, at each individual point of the aperture 8 or in the region radially immediately prior to the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle α between the direction vector 17 for the direction of conveying and the direction vector for the direction 19 of rotation, measured at the point 20 that is associated with the aperture 8 and situated furthest upstream in relation to the direction 12 of rotation, or at the edge associated with the aperture 8 and situated furthest upstream, is approximately maximally about 160°.

As one continues to proceed to the left along the aperture 8, i.e. in the direction 12 of rotation, the oblique angle α continues to increase. In the centre of the aperture 8, the angle between the direction vectors is about 180° and the scalar product is maximally negative, and further to the left from there the angle indeed becomes >180° and the scalar product in turn decreases, but still remains negative.

An angle β, not included in the drawing in FIG. 2, measured in the centre of the aperture 8, between the direction vector for the direction 19 of rotation and the direction vector for the direction 17 of conveying is about 175°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

Figure 3:
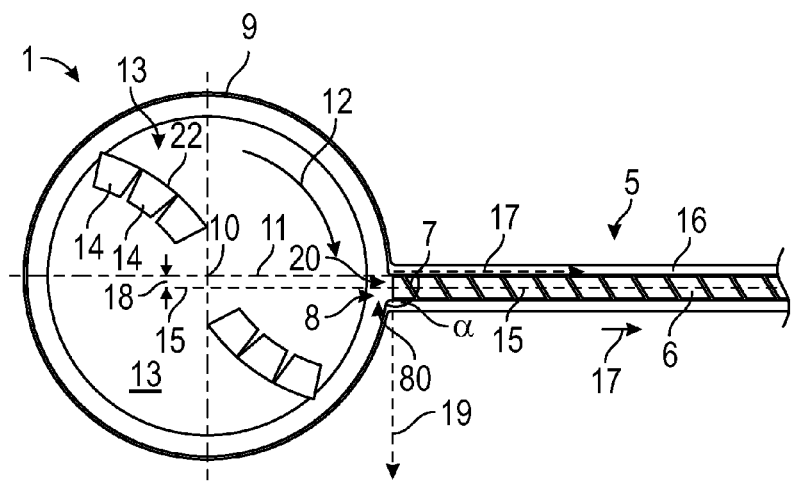
FIG. 3 shows another embodiment with minimal offset.

FIG. 3 shows an alternative embodiment in which the extruder 5 is not attached tangentially to the container 1 but instead is attached by its end 7. The screw 6 and the housing 16 of the extruder 5 have been adapted in the region of the aperture 8 to the shape of the inner wall of the container 1, and have been offset backwards so as to be flush. No part of the extruder 5 protrudes through the aperture 8 into the space within the container 1.

The distance 18 here corresponds to about 15 to 20% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, where this is the point located at the edge that is associated with the aperture 8 and situated furthest upstream. The angle α between the direction vector 17 for the direction of conveying and the direction vector for the direction 19 of rotation, measured at point 20 in FIG. 3, is precisely 90°. If one proceeds to the left along the aperture 8, i.e. in the direction 12 of rotation, the angle α becomes ever greater and becomes an oblique angle >90°, and at the same time the scalar product becomes negative. However, at no point, or in no region of the aperture 8 is the scalar product positive, or the angle α smaller than 90°. No local overfeed can therefore occur even in a subregion of the aperture 8, and no detrimental excessive stuffing effect can occur in a region of the aperture 8.

This also represents a decisive difference in relation to a purely radial arrangement, since the point 20 or the edge 20' would exhibit an angle α<90° in a radial arrangement of the extruder 5, and those regions of the aperture 8 situated, in the drawing, on the right-hand side alongside the radial 11 or upstream thereof or on the inflow side thereof would have a positive scalar product. it would thus be possible for locally melted plastics product to accumulate in these regions.

Figure 4:
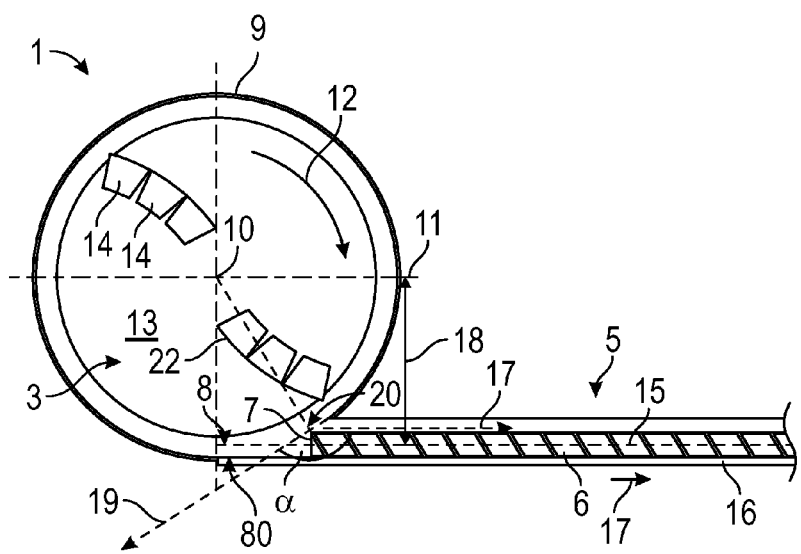
FIG. 4 shows another embodiment with relatively large offset.

FIG. 4 depicts another alternative embodiment in which the extruder 5 is somewhat further offset than in FIG. 3 on the outflow side, but still not tangentially as in FIGS. 1 and 2. In the present case, as also in FIG. 3, the rearward imaginary continuation of the longitudinal axis 15 of the extruder 5 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no oblique transitional edge. At this extreme outflow-side point of the aperture 8, on the extreme left-hand side in FIG. 4, the angle is about 180°.

FIGS. 1 to 4 provide details of the substantial properties and advantages of the direction of rotation of the mixing implement in relation to the direction 17 of conveying of the screw 6, where these are closely involved with the conveying of, and treatment process for, the material in the screw 6 immediately after intake of the material, downstream of the intake aperture. The direction of rotation of the mixing implements and the specific design of a wall section 105 of the housing 16 of the screw 6 provide substantial advantages.

According to FIGS. 5 to 8, a wall section 105 follows the intake aperture 80 over a length L. In the wall section 105 that is part of the housing 16 and that immediately follows the intake aperture 80 in the direction 17 of conveying and that completely surrounds the screw 6, there is a pocket 100 which extends in the direction 17 of conveying, from the furthest downstream point 20 or edge 20' of the intake aperture 80—seen in the direction 17 of conveying—over a length L where $0.8 \ d \leq L \leq 9 \ d$, preferably $1 \ d \leq L \leq 7 \ d$, where d is the diameter of the screw 6 in the wall section 105.

The container 1 shown in FIGS. 5 to 8, and its connection to the housing 16, correspond to the container and the connection depicted in FIGS. 5 to 8.

Figure 6:
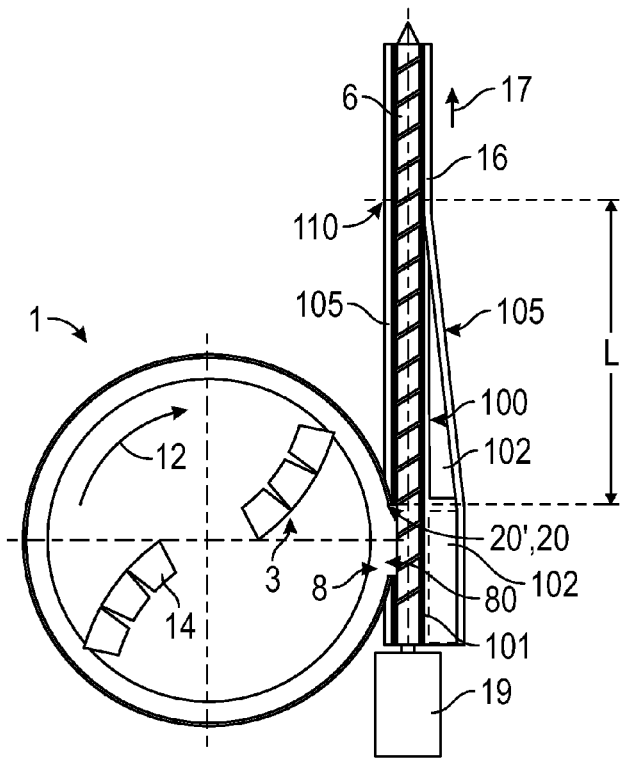
Figure 7:
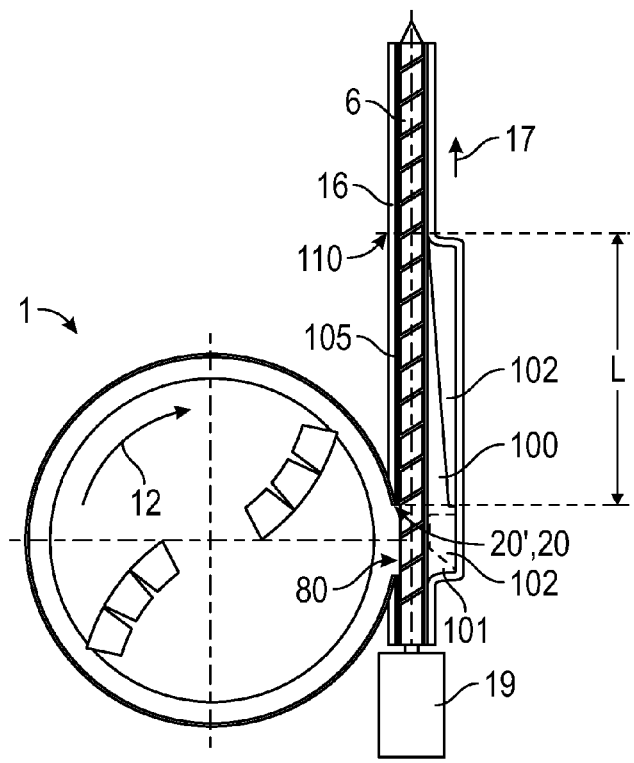

This pocket 100 improves the non-aggressive input of the material introduced from the container 3 and conducts this material in a non-aggressive manner into the flights of the screw 6. As depicted in FIG. 6, there can be a further pocket 101, as depicted in FIG. 6, extending in the region of the intake aperture 80 and the region that follows the intake aperture 80 in a direction opposite to the direction 17 of conveying. However, another possibility, as depicted in FIG. 7, is that a wall section with a further pocket 101 extends only in front of the intake aperture 80 in the housing 16.

Ribs or bars 102 now extend from the internal wall of the housing 16 in the direction of the screw 6 in the pocket 100 in the wall section 105. Instead of these ribs or bars 102 there can also be displaceable elements which have the same effect. These retarding elements have the effect of introducing the material located in the pocket into the screw. Grooves 103 or comparable depressions, in the internal wall of the housing 16, can also assume the function of retarding elements of this type. Grooves 103 of this type are included by way of example in the drawing in FIG. 8.

Figure 5:
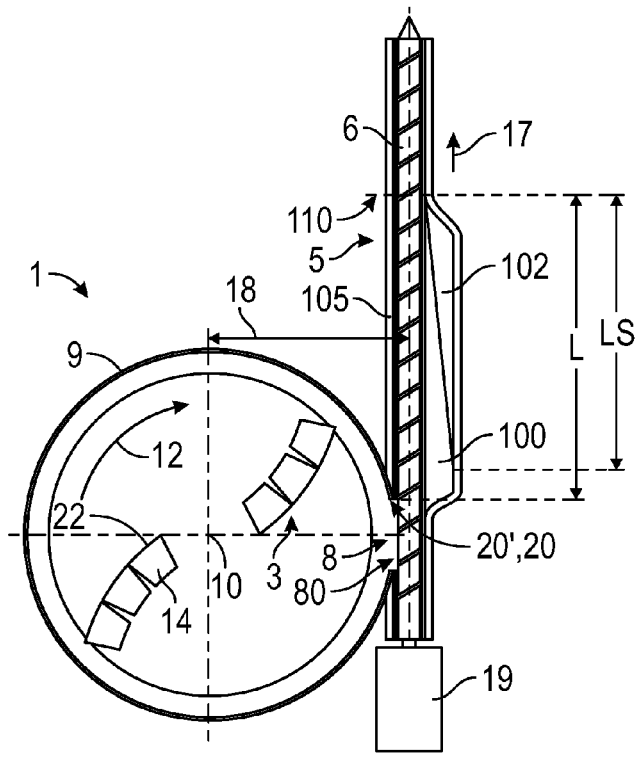
FIGS. 5 to 8 show embodiments with pockets in the screw housing.

The retarding elements provided can be in the pocket 100, and also in the further pocket 101, and it can be advantageous here if the retarding elements 102, 103 extend over the entire length of the pocket 100 and, respectively, over the entire length of the further pocket 101. Another possibility, however, is that, as depicted in FIG. 5, the retarding elements extend only over a subregion of the length of the wall section 105. The retarding elements can start at the point 20 or the edge 20' and can end prior to or at the position of the point 110, at which the wall section 105 ends. It is also possible that the retarding elements 102, 103 extend only over a region which is at a distance from the point 20 or from the edge 20' and also at a distance from point 110.

The length LS of the respective retarding element 102, 103 in the pocket 100 can be from 60 to 100% of L, preferably from 75% to 100% of L, i.e. of the length of the pocket, where L is from 0.8 to 9 d, preferably from 1 to 7 d. The retarding element 102, 103 advantageously starts at the downstream edge 20' of the intake aperture in the direction of conveying of the screw 6, or at the furthest downstream point 20 of the intake aperture. It is also possible that the retarding element 2, 3 starts only at a prescribed distance from this point 20 or from the edge 20'. starts at the furthest downstream point 20 or edge 20' of the intake aperture 80 in the direction 16 of conveying.

Figure 8:
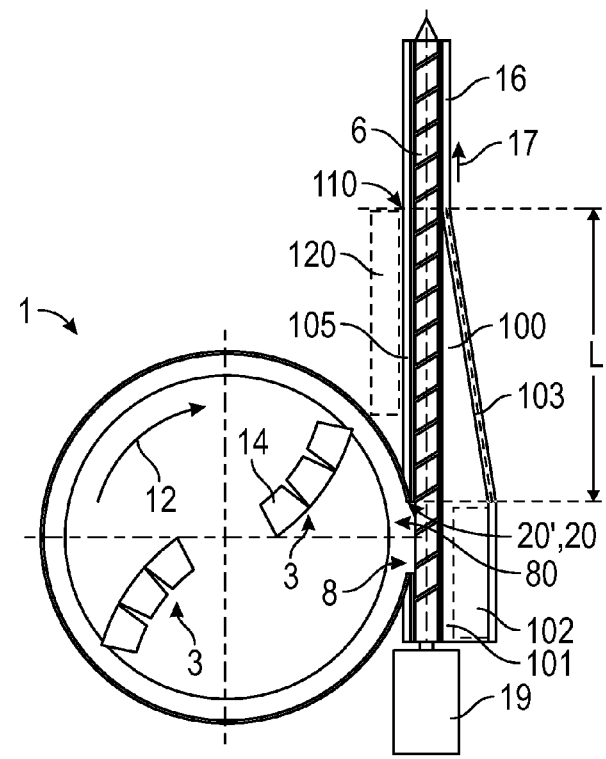

The retarding elements 102, 103 can be present in pockets 100 and/or pockets 101 having a cross section of any desired shape. The wall section 105 as depicted in FIGS. 6 and 8 has a pocket that narrows in the direction 17 of conveying, in particular a pocket that narrows conically, whereas the wall section 105 as depicted in FIGS. 5 and 7 has an internal wall area that runs in essence parallel to the direction 17 of conveying. In accordance with FIG. 6, the ribs 102 in the pocket 100 are in line with those in the further pocket 101.

It is very generally advantageous if the retarding elements 102, 103 in the pocket 100 are in line with those in the further pocket 101.

According to FIG. 7, the rib 102 in the pocket 100 and in the further pocket 101 exhibits, over its length in the direction 17 of conveying, a decreasing distance from the screw 6.

In another possibility, the distance between the retarding elements 102, 103 and the envelope curve of the screw 6 remains constant or decreases in the direction of conveying.

For certain intended purposes, it can be advantageous if, in the direction 17 of conveying, the respective retarding element 102, 103 extends in a straight line parallel to the axis of the screw 6 or, in the form of a helix, surrounds the screw 6 along its periphery, where the pitch of the helix is greater than the pitch of the screw 6. The helix angle of the retarding elements 102, 103 with respect to the direction 17 of conveying is from 0° to 75°. The figures do not depict retarding elements 2, 3 in the form of a helix around the screw 6.

For transferring material into the screws 6, in particular in the region of the pocket 100 that follows the intake region, it is advantageous if the rib 102 or the displaceable element extends advantageously radially into the pocket 100 or the further pocket 101, and represents a barrier to transport the material around the screw 6.

It is possible that retarding elements 102, 103 in the pocket 100 extend onwards into the further pocket 101, thus forming continuous retarding elements. It is moreover also advantageous if the internal cross section of the further pocket 101 corresponds to the cross section of the pocket 100 at the point 20 or at the edge 20'.

It has proven advantageous for practical purposes if the number A of the retarding elements 102, 103 in the wall section 105, and therefore also the number of the pockets 100 A=d/K, where d is the diameter of the screw 6 measured in mm and K is a value in the range from 10 to 110, in particular from 15 to 90. The number of retarding elements, distributed over the periphery of the wall section 105, and required for a successful process to treat material, can thus be determined for a given screw diameter.

It has been found that the retarding elements provided within the wall section 105, but especially the presence of a pocket 100 in this region, achieve feed or introduction into the flights of the screw 6 in a manner which is beneficial to the material or to the properties of the material. Evidence of this is provided by the improved properties of the treated or molten materials obtained at the discharge aperture of the screw 6. The direction of the material introduced from the mixing implements 14 into the intake aperture 80 also has a favourable effect together with the effect of the pocket 100.

For a further improvement in the properties of the material, it is advantageous if at least a subsection of the wall section 105 surrounding the pocket 100 has a cooling unit 120, and it is advantageous here that, in the wall of the housing 16, there is a cooling jacket surrounding the housing 16, and/or there are cooling ducts.

The structure of the apparatus according to the invention is simplified if the wall section 105 that is part of the housing 16 and that forms the pocket 100 is a housing part that can be inserted exchangeably into the housing 16 and that preferably has the length L, or in that the pocket 100 is within a bushing which preferably has the length L and which can be inserted exchangeably into the housing 16.

In this case, by using connections not depicted, the wall section from the point 20 or from the edge 20' as far as the point 110 can be removed and replaced by another wall section 105 with appropriate retarding elements 102, 103.

The design of the retarding elements 102, 103 is determined inter alia by the materials requiring treatment or requiring conveying, and also depends on the composition of the materials and/or on the contaminants entrained with the material.

In the housing section that follows the wall section 105 in the direction 17 of conveying, the screw 6, as far as the discharge aperture 30, can be of any desired conventional design, dependent on the desired treatment of the material.

The manner of cooling of the wall section 105 is selected by the person skilled in the art; a factor of substantial importance is the possibility of cooling the screw 6 in this region of the housing 16.

The screw 6 has a constant external and/or core diameter at least within the wall section 105, and preferably over the entire length of the screw.

The transitions between the housing 16 and the wall regions of the pocket 100 are advantageously of rounded design; a stepped design is also possible.

The invention claimed is:

1. An apparatus for the pretreatment and subsequent conveying, plastification or agglomeration of plastics waste for recycling purposes, with a container (1) for the material to be processed, wherein at least one mixing and/or comminution implement (3) which rotates around an axis (10) of rotation and which is intended for the mixing, heating and optionally comminution of the plastics material is in the container,
   where an aperture (8) through which the pretreated plastics material can be removed from the interior of the container (1) is formed in a side wall (9) of the container (1) in the region of the level of the, or of a lowest, mixing and/or comminution implement (3) that is closest to the base,
   where at least one conveyor (5) or extruder (5), is provided to receive the pretreated material, and has at least one screw (6) which rotates in a housing (16) and which has plastifying or agglomerating action, where the housing (16) has, located at its end (7) or in its jacket wall, an intake aperture (80) for the material to be received by the screw (6), and there is connection between the intake aperture (80) and the aperture (8),
   wherein
   the imaginary continuation of the central longitudinal axis (15) of the conveyor (5) or of the screw (6) closest to the intake aperture (80), in a direction opposite to the direction (17) of conveying of the conveyor (5), passes, and does not intersect, the axis (10) of rotation, where, on an outflow side or in the direction (12) of rotation or of movement of the mixing and/or comminution implement (3), there is an offset distance (18) between the longitudinal axis (15) of the conveyor (5) or of the screw (6) closest to the intake aperture (80), and a radius (11) that is associated with the container (1) and that is parallel to the longitudinal axis (15) and that proceeds outwards from the axis (10) of rotation of the mixing and/or comminution implement (3) in the direction (17) of conveying of the conveyor (5), and wherein in a wall section (105) that is part of the housing (16) and that immediately follows the intake aperture (80) in the direction (17) of conveying and that completely surrounds the screw (6), there is a pocket (100) which extends in the direction (17) of conveying, starting at the downstream edge (20') of the intake aperture (80) or at the furthest downstream point (20) of the intake aperture (80), over a length (L), where $0.8\,d \leq L \leq 9\,d$, where d is the external diameter or the diameter of an envelope defined by rotation of the screw (6) in the wall section (105).

2. The apparatus according to claim 1, wherein, for the conveyor (5) in contact with the container (1), a scalar product of a direction vector that is associated with a direction (19) of rotation and that is tangential to a circle described by the radially outermost point of the mixing and/or comminution implement (3) or that is tangential to the plastics material transported past the aperture (8) and that is normal to the radius (11) of the container (1), and that points in the direction (12) of rotation or of movement of the mixing and/or comminution implement (3) and of the direction vector (17) that is associated with the direction of conveying of the conveyor (5) at each individual point or in the entire region of the aperture (8) or immediately radially prior to the aperture (8) is zero or negative.

3. The apparatus according to claim 1, wherein an angle ($\alpha$) included between a direction vector that is associated with a direction (19) of rotation of the radially outermost point of the mixing and/or comminution implement (3) and a direction vector (17) that is associated with the direction of conveying of the conveyor (5) is greater than or equal to 90° and smaller than or equal to 180°, measured at a point of intersection of the two direction vectors (17, 19) at an inflow-side edge that is associated with the aperture (8) and that is situated upstream in relation to the direction (12) of rotation or of movement of the mixing and/or comminution implement (3) at the point (20) that is on the said edge or on the aperture (8) and is situated furthest upstream.

4. The apparatus according to claim 1, wherein an angle ($\beta$) included between a direction vector (19) that is associated with the direction (12) of rotation or of movement and a direction vector (17) that is associated with the direction of conveying of the conveyor (5) is from 170° to 180°, measured at the point of intersection of the two direction vectors (17, 19) in the middle of the aperture (8).

5. The apparatus according to claim 1, wherein the offset distance (18) is greater than or equal to half of the internal diameter of the housing (16) of the conveyor (5) or of the screw (6), and/or greater than or equal to 7% of a radius of the container (1), or wherein the distance (18) is greater than or equal to the radius (11) of the container (1).

6. The apparatus according to claim 5, wherein the offset distance (18) is greater than or equal to half of the internal diameter of the housing (16) of the conveyor (5) or of the screw (6), and/or greater than or equal to 20% of the radius of the container (1).

7. The apparatus according to claim 1, wherein the imaginary continuation of the longitudinal axis (15) of the conveyor (5) in a direction opposite to the direction of conveying is arranged in the manner of a secant in relation to the cross section of the container (1), and, at least in sections, passes through the space within the container (1).

8. The apparatus according to claim 1, wherein the conveyor (5) is attached tangentially to the container (1) or runs tangentially in relation to the cross section of the container (1), or wherein the longitudinal axis (15) of the conveyor (5) or of the screw (6) or the longitudinal axis of the screw (6) closest to the intake aperture (80) runs tangentially with respect to the inner side of the side wall (9) of the container (1), or the inner wall of the housing (16) does so, or the screw (6) does so, where a is drive connected to the end (7) of the screw (6), and that the screw provides conveying, at its opposite end, to a discharge aperture which is an extruder head and which is arranged at the end of the housing (16).

9. The apparatus according to claim 1, wherein there is immediate and direct connection between the aperture (8) and the intake aperture (80), without substantial separation or without a transfer section or a conveying screw.

10. The apparatus according to claim 1, wherein the mixing and/or comminution implement (3) comprises implements and/or blades (14) which, in the direction (12) of rotation or of movement, have a comminuting, cutting and heating effect on the plastics material, where the implements and/or blades (14) are arranged or formed on or at a rotatable implement carrier (13) which is a carrier disc (13) and which is arranged parallel to a basal surface (2) of the container (1).

11. The apparatus according to claim 1, wherein a manner of formation, set-up, curvature and/or arrangement of frontal regions or frontal edges (22) that are associated with the mixing and/or comminution implements (3) or with blades (14), act on the plastics material and point in the direction (12) of rotation or of movement, differs when comparison is made with the regions that, in the direction (12) of rotation or of movement, are at a rear or behind.

12. The apparatus according to claim 1, wherein the container (1) is in essence cylindrical with circular cross section and with a level basal surface (2) and with, orientated vertically in relation thereto, a side wall (9) which has the shape of the jacket of a cylinder, and/or the axis (10) of rotation of the mixing and/or comminution implements (3) coincides with the central axis of the container (1), and/or the axis (10) of rotation or the central axis are orientated vertically and/or normally in relation to the basal surface (2).

13. The apparatus according to claim 1, wherein a lowest implement carrier (13) or a lowest of the mixing and/or comminution implements (3) and/or the aperture (8) are arranged close to the base at a small distance from a basal surface (2) in the region of the lowest quarter of the height of the container (1) and at a distance of from 10 mm to 400 mm from the basal surface (2) of the container (1).

14. The apparatus according to claim 1, wherein the conveyor (5) is a single-screw extruder (6) with a single compression screw (6), or is a twin- or multiscrew extruder, where the diameters d of the individual screws (6) are all identical.

15. The apparatus according to claim 1, wherein, in the housing (16), in the region along the intake aperture (80), there is a second pocket (101).

16. The apparatus according to claim 1, wherein, in the pocket (100) and optionally in a second pocket (101), there is at least one retarding element (102, 103) which assists the flow of material in the direction (16) of conveying, or which assists the introduction of material into the screw (6), and which takes the form of a rib or of a displaceable element (102), or of a wall groove (103).

17. The apparatus according to claim 1, wherein a retarding element (102, 103) extends over the entire length of the pocket (100) or over the entire length of a further pocket (101).

18. The apparatus according to claim 1, wherein a length (LS) of a respective retarding element (102, 103) in the pocket (100) is from 60% to 100% of L, and a retarding element (2, 3) extends in the direction (16) of conveying, starting from the downstream edge (20') of the intake aperture (80) or from the furthest downstream point (20) of the intake aperture (80).

19. The apparatus according to claim 18, wherein the length (LS) of the respective retarding element (102, 103) in the pocket (100) is from 75% to 100% of L.

20. The apparatus according to claim 1, wherein the internal wall area of the wall section (105) is cylindrical or narrows in the direction (16) of conveying.

21. The apparatus according to claim 20, wherein the internal wall area of the wall section (105) conically narrows in the direction (16) of conveying.

22. The apparatus according to claim 1, wherein the distance between a rib or a displaceable element (102) and the envelope of the screw (6) in the pocket (100) and/or in a further pocket (101) is constant, or the distance between the rib or the displaceable element and the envelope of the screw (6) in the pocket (100) and/or in the further pocket (101) alters and decreases in the direction of conveying.

23. The apparatus according to claim 1, wherein, in the direction (17) of conveying, a respective retarding element (102, 103) extends in a straight line parallel to the axis of the screw (6), or, in the form of a helix, surrounds the screw (6) along the periphery thereof, where the pitch of the helix is greater than the pitch of the screw (6).

24. The apparatus according to claim 1, wherein a rib (102) or a displaceable element extends radially into the housing (16).

25. The apparatus according to claim 1, wherein at least one of retarding elements (102, 103) provided in the pocket (100) of the wall section (105) extends into a further pocket (101).

26. The apparatus according to claim 1, wherein the internal cross section of a further pocket (101) corresponds to the cross section of the pocket (100) at the point (20) or at the edge (20').

27. The apparatus according to claim 1, wherein a number (A) of retarding elements (102, 103) in the wall section (105), and therefore also the number of pockets (100) A=d/K, where d is the diameter of the screw (6) measured in mm and K is a value in the range from 10 to 110.

28. The apparatus according to claim 27, wherein K is a value in the range from 15 to 90.

29. The apparatus according to claim 1, wherein the capacity (V) of the pocket (100) per unit of length=k Vs, where k is a value in the range from 0.025 to 2, and Vs is the capacity of the screw (6) per unit of length.

30. The apparatus according to claim 29, wherein k is a value in the range from 0.05 to 1.5.

31. The apparatus according to claim 1, wherein the retarding elements (102, 103) are helical, and wherein a helix angle of retarding elements (102, 103) with respect to the direction (17) of conveying is from 0° to 75°.

32. The apparatus according to claim 1, wherein, at least in the region of the pocket (100), the screw (6) is an extruder screw with constant core diameter.

33. The apparatus according to claim 1, wherein at least a subsection of the wall section (105) surrounding the pocket (100) has a cooling unit (120), and in the wall of the housing (16), there is a cooling jacket surrounding the housing (16), and/or there are cooling ducts.

34. The apparatus according to claim 1, wherein the wall section (105) that is part of the housing (16) and that forms the pocket (100) is a housing part that can be inserted exchangeably into the housing (16) and that has the length L, or wherein the pocket (100) is within a bushing which has the length L and which can be inserted exchangeably into the housing (16).

35. The apparatus according to claim 1, wherein 1 d≤L≤7 d.

* * * * *